United States Patent
Thackray (12)

(10) Patent No.: US 6,481,342 B2
(45) Date of Patent: Nov. 19, 2002

(54) KITCHEN APPLIANCE HAVING A HOUSING AND HAVING AN ADD-ON UNIT WHICH CAN BE ACCOMMODATED IN THE KITCHEN APPLIANCE AND WHOSE FUNCTIONALITY IS INDEPENDENT OF THE KITCHEN APPLIANCE

(75) Inventor: Donald T. Thackray, Zuidlaren (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/995,462

(22) Filed: Nov. 27, 2001

(65) Prior Publication Data

US 2002/0078834 A1 Jun. 27, 2002

(30) Foreign Application Priority Data

Nov. 29, 2000 (EP) .............................................. 00890356

(51) Int. Cl.$^7$ .......................... A23N 1/02; A47J 43/046; A47J 43/06; A47J 43/07; B02C 18/12
(52) U.S. Cl. ............................ 99/340; 99/484; 99/492; 99/510; 241/37.5; 241/92; 241/101.01; 241/282.1
(58) Field of Search .......................... 99/339, 340, 492, 99/509–513, 484; 366/205, 291, 297–300, 314, 601; 241/37.5, 92, 100, 101.01, 282.1, 282.2, 101.2; 248/605, 612, 634

(56) References Cited

U.S. PATENT DOCUMENTS

| 3,722,831 | A | * | 3/1973 | Bialas et al. ................ 366/291 |
| 3,895,781 | A | * | 7/1975 | Lodige et al. ........... 366/291 X |
| 4,189,241 | A | * | 2/1980 | Baldacci ..................... 366/297 |
| 4,542,857 | A | * | 9/1985 | Akasaka ...................... 241/92 |
| 4,691,870 | A | * | 9/1987 | Fukunaga et al. ...... 241/37.5 X |
| 4,747,695 | A | * | 5/1988 | Schmidt ..................... 366/291 |
| 4,799,626 | A | * | 1/1989 | Hickel et al. ......... 241/282.1 X |
| 4,911,557 | A | * | 3/1990 | Dormer et al. .......... 366/314 X |
| 5,071,077 | A | * | 12/1991 | Arroubi et al. ....... 241/282.2 X |
| 5,435,237 | A | * | 7/1995 | Huang ......................... 99/492 |
| 5,524,530 | A | * | 6/1996 | Nijzingh et al. ............. 99/492 |
| 5,875,706 | A | * | 3/1999 | Borger et al. ................ 99/492 |

FOREIGN PATENT DOCUMENTS

| GB | 726460 A | 3/1955 |
| WO | WO9520903 | 8/1995 |

OTHER PUBLICATIONS

Food processor of Philips, HR7715, HR7727, HR7805, Undated.

* cited by examiner

Primary Examiner—Timothy F. Simone
(74) Attorney, Agent, or Firm—Ernestine C. Bartlett

(57) ABSTRACT

A kitchen appliance (1) has a housing (3) having a first housing area (6) in which a first container (8) and a second housing area (7) in which a second container (17) can be placed onto the housing (3), which kitchen appliance (1) has an add-on unit (25) which can be accommodated in the second housing area (7) of the kitchen appliance (1) when the second container (17) is not in place.

6 Claims, 3 Drawing Sheets

KITCHEN APPLIANCE HAVING A HOUSING AND HAVING AN ADD-ON UNIT WHICH CAN BE ACCOMMODATED IN THE KITCHEN APPLIANCE AND WHOSE FUNCTIONALITY IS INDEPENDENT OF THE KITCHEN APPLIANCE

FIELD OF THE INVENTION

The invention relates to a kitchen appliance having a housing which has a first housing area for placing a first container and a second housing area for placing a second container.

BACKGROUND OF THE INVENTION

Such a kitchen appliance has been put on the market by the Applicant in a plurality of variants, for example the variants marketed under the type designations HR7715 and HR7727 and HR7805, and is consequently known. The second container of the known kitchen appliance is formed by a so-called liquidizer, which can be placed onto the kitchen appliance in the second housing area of the housing of the kitchen appliance and which can be locked to the kitchen appliance with the aid of coupling elements, which in this case are constructed to form bayonet locks, a mixing tool disposed in the liquidizer then entering into driving engagement with a drive shaft which projects from the housing in the second housing area, as a result of which the mixing tool can be driven and, consequently, a mixing operation can be performed. The liquidizer of the known kitchen appliance can be detached from the kitchen appliance, which allows a protective cover to be mounted in the second housing area in place of the liquidizer, which cover can also be locked to the housing with the aid of bayonet locks to protect the drive shaft, which projects from the housing. The kitchen appliance is adapted to allow a pot-shaped processing container to be placed in its first housing area, into which container, for example, a kneading tool or a stirring tool or a cutting tool can be inserted, which tools are rotationally drivable via a drive shaft which projects from the housing of the kitchen appliance in the first housing area.

When in the pot-shaped processing container of the known kitchen appliance, for example, a kneading operation is performed in order to prepare a batter, it is very often necessary to weigh out the ingredients needed for preparing the batter, such as flour, sugar and the like, which in the case of the known kitchen appliance requires separate kitchen scales to be placed near the kitchen appliance. If a cookbook is needed to prepare the batter, such a cookbook should be put beside the kitchen appliance, which is likely to give rise to staining. These situations are therefore unsatisfactory and by many users of the known kitchen appliance they are regarded as unpleasant and not user-friendly.

SUMMARY OF THE INVENTION

It is an object of the invention to provide a solution for the aforementioned shortcomings in a simple manner and by simple means.

In order to achieve this object characteristic features in accordance with the invention are provided in a kitchen appliance in accordance with the invention, in such a manner that a data kitchen appliance in accordance with the invention can be characterized in the manner defined hereinafter, namely:

A kitchen appliance having a housing, which has a first housing area and a second housing area and which is adapted to carry a first container in the first housing area and which is adapted to carry a second container in the second housing area, and having an add-on unit which can perform a functionality which is independent of the kitchen appliance, which add-on unit can be accommodated in the second housing area when the second container is not in place.

The provision of the measures in accordance with the invention makes it possible in a simple and space-saving manner and with only few additional means to accommodate an add-on unit for the kitchen appliance in the second housing area of the kitchen appliance and to position it with respect to the housing. This has the advantage that the add-on unit is positioned directly on the kitchen appliance and as a result of this, the use of the add-on unit as well as the operation of the add-on unit and, if required, the supply of foodstuffs (which have been processed by a suitable add-on unit) to the first container situated in the first housing area can be particularly simple. Another advantage of the solution in accordance with the invention is that the add-on unit can be coupled to the kitchen appliance so as to form a structural unit therewith and can also be detached from the kitchen appliance and can thus be utilized and operated fully independently of the kitchen appliance in accordance with its autonomous functionality. Such an independent use of the add-on unit is not possible if the add-on unit forms a fixed combination with the kitchen appliance.

In a kitchen appliance in accordance with the invention the add-on unit can simply be accommodated in the second housing area when the second container is not in place, without being secured by separate coupling means or retaining means. The add-on unit may be accommodated, for example, in a shallow recess provided in the second housing area which prevents the add-on unit from sliding off the housing. Moreover, a kitchen appliance in accordance with the invention, in which a protective cover can be placed onto the housing and can be coupled to the housing when the second container is not in place, may be constructed in such a manner that the add-on unit can be placed onto the protective cover and can thus be accommodated in the second housing area, the protective cover then forming an adapter between the housing of the kitchen appliance and the add-on unit. In a kitchen appliance in accordance with the invention, preferably in preferred embodiments housing coupling elements are provided in the second housing area, which serve to and are adapted to cooperate both with container coupling elements of the second container and to cooperate with additional-unit coupling elements of the add-on unit, because this guarantees a reliable coupling of the add-on unit of the kitchen appliance to the housing of the kitchen appliance and a particularly simple construction.

With a kitchen appliance in accordance with the invention, preferably in preferred embodiments, the add-on unit has add-on-unit coupling elements adapted to form bayonet locks. This guarantees a stable and reliable coupling of the add-on unit to the housing of the kitchen appliance.

In particularly preferred embodiments, the add-on unit takes the form of a pair of scales. Thus, it is achieved that, in the case that the pair of scales is coupled to the kitchen appliance in the second housing area of the housing of the kitchen appliance, the substance or ingredient just weighed out can be put into the first container of the kitchen appliance along the shortest path, as a result of which spilling of foodstuffs, for example flour or sugar, is avoided.

The above-mentioned as well as further aspects of the invention will become apparent from the embodiment described hereinafter by way of example and will be elucidated with reference to this example.

The invention will now be described in more detail with reference to the drawings, which show an embodiment which is given by way of example but to which the invention is not limited.

DETAILED DESCRIPTION OF PREFERRED EMBODIMENTS

Figure 1:
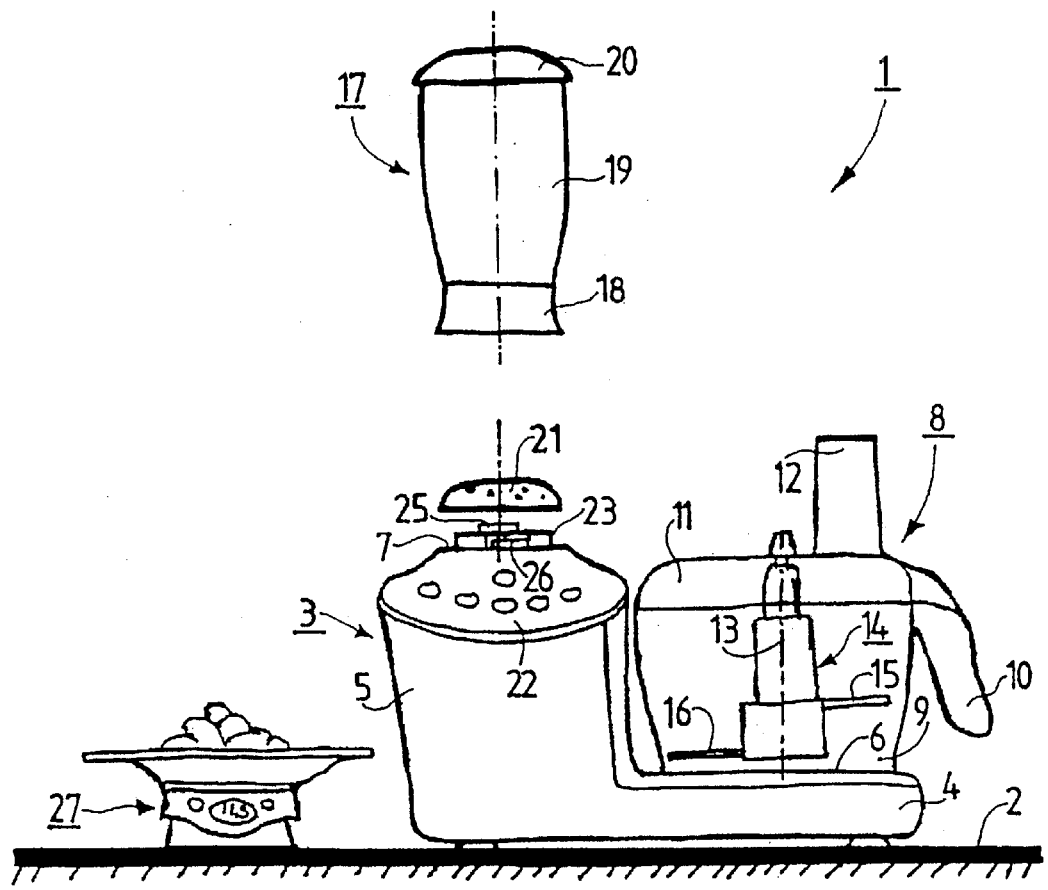
FIG. 1 is a sketch which shows a kitchen appliance embodying the invention, in which a pair of scales provided as an add-on unit for the kitchen appliance is detached from the kitchen appliance.
Figure 2:
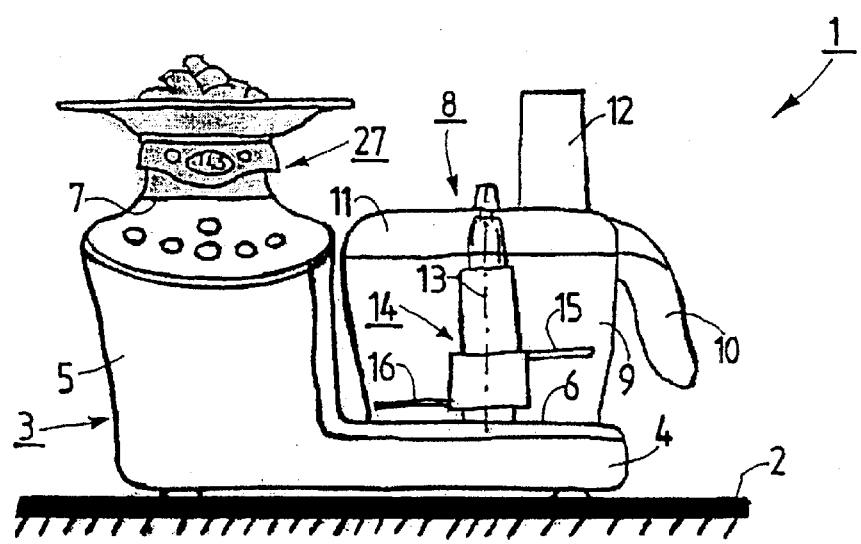
FIG. 2, in a manner similar to FIG. 1, shows the kitchen appliance of FIG. 1, the scales provided as an add-on unit being placed on the housing of the kitchen appliance.

FIGS. 1 and 2 show a kitchen appliance 1 placed on a work top 2 of a kitchen unit. The kitchen appliance 1 has a housing 3, which consists of a base section 4 and a tower section 5, which projects from the base section 4. In the area of the base section 4 there is a first bounding wall 6, which forms a first housing area of the housing 3. In the area of the tower section 5 there is a second bounding wall 7, which forms a second housing area of the housing 3.

In the first housing area formed by the first bounding wall 6 the housing 3 is adapted to carry or accommodate a first container 8. The first container 8 is a pot-shaped processing container, which consists of a basic part 9 having a handle 10 and a lid 11 having a feed-in tube 12. In the interior of the first container 8 a tool 14 is disposed, which tool 14 is drivable so as to rotate about an axis 13 and takes the form of a cutting tool having two cutting blades 15 and 16. The tool 14 is rotationally drivable with the aid of a drive member, which is not shown and which projects from the housing 3 in the area of the first bounding wall 6.

In the second housing area formed by the second bounding wall 7 the housing 3 is adapted to carry or accommodate a second container 17. The second container 17 is a so-called liquidizer or pitcher, which consists of a plastic base 18 and of a glass or a transparent plastic container 19, which is connected to the base 18, and of a cover 20. FIG. 1 shows the second container 17 in a position detached from the kitchen appliance 1. With the first container 17 removed a protective cover 21 can be attached to the housing 7 in the second housing area 7.

Figure 6:
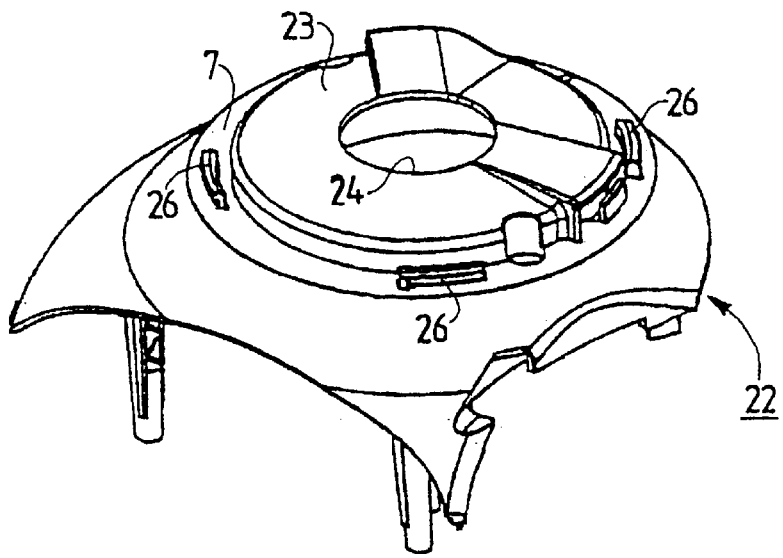
FIG. 6 shows a housing part of the housing of the kitchen appliance of FIGS. 1 and 2 in an oblique view from the top, on which housing part the scales of FIGS. 3 and 4 can be placed.

In the second housing area formed by the second bounding wall 7 there is a cover 23 which projects from the second bounding wall 7 and which is integral with the housing section 22 bounded by the second bounding wall 7, which cover has an opening 24 for the passage of a drive shaft 25 for driving a mixing tool which is present in the liquidizer but which is not shown. The second bounding wall 7 is formed with housing coupling elements 26. As can be seen in FIG. 6, the second bounding wall 7 has four such coupling elements 24 in total. The coupling elements 24 are formed by elongate ribs of L-shaped and consequently hook-shaped cross-section, which project from the second bounding wall 7. The housing coupling elements 24 serve to and are adapted to cooperate with container coupling elements of the second container 17. The container coupling elements of the second container 17 are not shown in the Figures. The container coupling elements of the second container 17 are arranged inside the base 18 and are formed by limbs which are integral with the base 18 and which project from the base in radial directions. The arrangement and dimensions of these limbs is selected in such a manner that after placement of the second container 17 onto the second bounding wall 7 and after a rotation of the second container 17 relative to the second bounding wall 7 the housing coupling elements 26 engage over the limbs. This means, in other words, that the housing coupling elements 24 and the container coupling elements, not shown, of the second container 17 are adapted to form so-called bayonet locks. The protective cover 21 can be locked to the housing 3 in exactly the same manner in the area of the second bounding wall 7.

Figure 3:
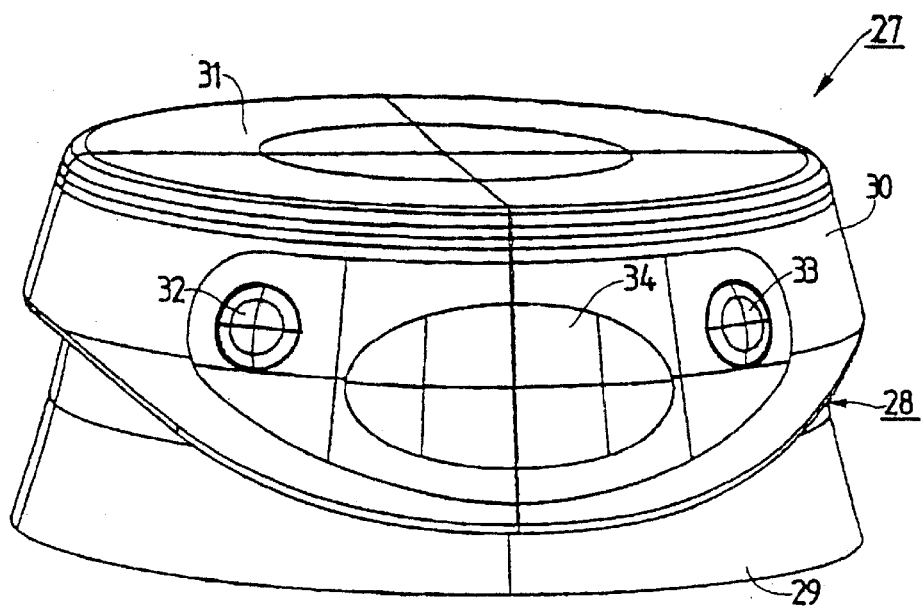
FIG. 3 shows the scales provided as an add-on unit for the kitchen appliance of FIG. 1 in an oblique view from the top.
Figure 4:
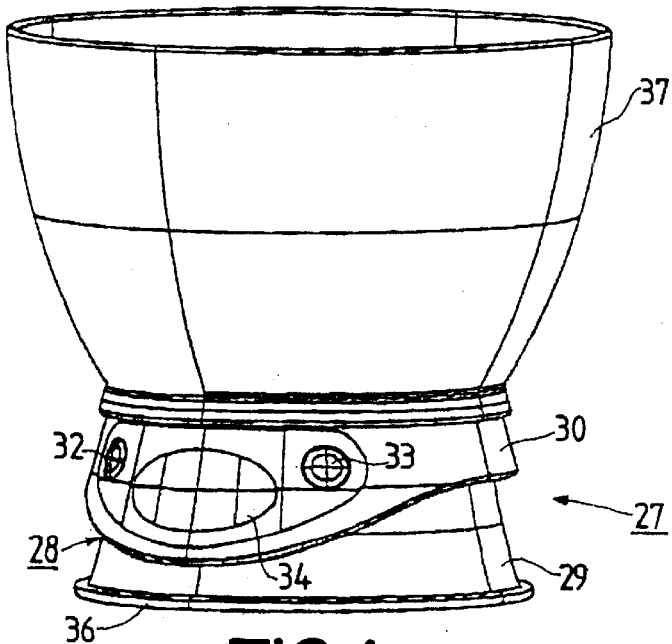
FIG. 4 shows the scales of FIG. 3 in an oblique view from the top, a container being placed on the scales in the upper area of the scales.
Figure 5:
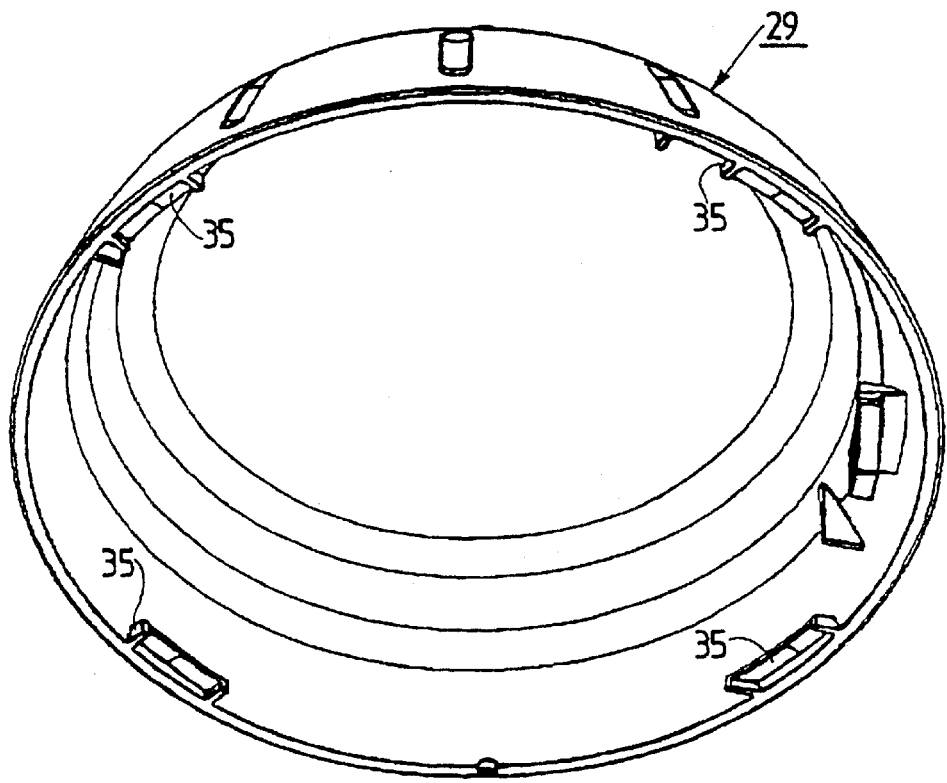
FIG. 5 shows the circumferential housing part of the scales of FIGS. 3 and 4 in an oblique view from underneath.

Advantageously, the kitchen appliance 1 shown in FIGS. 1 and 2 is equipped with an add-on unit, which add-on unit, in the present case, is formed by a pair of scales 27, which is shown in FIGS. 3 and 4. The pair of scales 27 has a housing 28, which consists of a bottom section 29 and an upper section 30, which is placed on the bottom section 29 and is connected to the bottom section 29 in a manner, not shown. The bottom section 29 of the housing is shown in FIG. 5. The upper section 30 of the housing 28 is bounded by an upper wall 31. Two control buttons 32 and 33 as well as a display device 34 are arranged in a circumferential area 30 of the upper section 30, which display device 34 is formed by a so-called 7-segment display module.

In the situation illustrated in FIG. 3 the pair of scales 27 provided and constructed as an add-on unit for the kitchen appliance 1 is adapted to cooperate directly with the kitchen appliance 1. When the second container 17 is not in place, the pair of scales 27, which has and can perform a functionality which, in itself, is fully independent of the kitchen appliance 1, can be arranged on the kitchen appliance 1 in the second housing area formed by the second bounding wall 7, i.e. in the present case it can take the place of the second container 17. This is the situation shown in FIG. 2.

The add-on unit for the kitchen appliance 1, i.e. the pair of scales 27, has add-on unit coupling elements 35 adapted to cooperate with the housing coupling elements 26 in the second housing area formed by the second bounding wall 7. With the aid of the add-on unit coupling elements 35 and the housing coupling elements 26 the add-on unit, i.e. the scales 27, can be locked to the housing 3. The add-on unit coupling elements 35 are formed by limbs, as can be seen in FIG. 5, which are arranged in the interior of the bottom section 29 of the housing 28 of the scales 27 and which project from the bottom section 29, said limbs being arranged and constructed so as to cooperate with the housing coupling elements 26 in order to form bayonet locks.

In the situation shown in FIG. 4 the pair of scales 27 provided and constructed as an add-on unit for the kitchen appliance 1 is adapted not to cooperate with the kitchen appliance 1 but to realize its functionality which is independent of the kitchen appliance 1, i.e. to separately perform weighing operations. In the present case, the pair of scales 27 is connected to a non-slip rubber ring 36 in the area of its bottom section 29. Furthermore, a weighing container 37 is positioned on the upper part 30 of the scales 27 in the area of the upper wall 31. The weighing container 37 is suitably made of a transparent material, but this is not necessarily so.

Instead of a pair of scales a clock may be provided as an add-on unit having a functionality which is independent of a kitchen appliance in accordance with the invention, which clock enables the duration of a processing operation performed by the kitchen appliance in accordance with the invention to be checked in an easy and simple manner. The add-on unit can also be a computer-aided portable information processing apparatus, which information processing apparatus makes it possible, for example, to retrieve a desired recipe and display it on a display screen of the information processing apparatus. It is likewise possible to use, for example, a suitably adapted and accordingly equipped portable telephone as an add-on unit. Moreover, it possible to use, for example, a book holding device as an add-on unit for a kitchen appliance in accordance with the invention, which book holding device is capable of holding a cookbook, which cookbook lists, for example, the ingredients required for preparing a batter.

I claim:

1. A kitchen appliance having a housing, which has a first housing area and a second housing area and which is adapted to carry a first container in the first housing area and which is adapted to carry a second container in the second housing area, and having an add-on unit which can perform a functionality which is independent of the kitchen appliance, which add-on unit can be accommodated in the second housing area when the second container is not in place.

2. A kitchen appliance as claimed in claim 1, in which housing coupling elements are provided in the second housing area, which coupling elements serve to and are adapted to cooperate with container coupling elements of the second container, and in which the add-on unit has add-on unit coupling elements which are adapted to cooperate with housing coupling elements in the second housing area, in order to enable the add-on unit to be locked to the housing.

3. A kitchen appliance as claimed in claim 2, in which the housing coupling elements and the add-on unit coupling elements are adapted to form bayonet locks.

4. A kitchen appliance as claimed in claim 1, in which the add-on unit takes the form of a pair of scales.

5. A kitchen appliance as claimed in claim 1, in which the add-on unit takes the form of a clock.

6. A kitchen appliance as claimed in claim 1, in which the add-on unit takes the form of a computer-aided information processing apparatus.

* * * * *